United States Patent
Lee et al.

(10) Patent No.: US 7,580,640 B2
(45) Date of Patent: Aug. 25, 2009

(54) METHOD AND APPARATUS FOR EXTRACTING OPTICAL CLOCK SIGNAL

(75) Inventors: Jaemyoung Lee, Seoul (KR); Je Soo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 511 days.

(21) Appl. No.: 11/546,749

(22) Filed: Oct. 12, 2006

(65) Prior Publication Data

US 2007/0086784 A1    Apr. 19, 2007

(30) Foreign Application Priority Data

Oct. 14, 2005    (KR) .................. 10-2005-0096948

(51) Int. Cl.
*H04B 10/00* (2006.01)
*H04B 10/12* (2006.01)

(52) U.S. Cl. .................. 398/155; 398/160; 359/325; 359/341.2; 359/495; 359/515

(58) Field of Classification Search .................. 398/155, 398/160; 359/325, 341.2, 495, 515
See application file for complete search history.

(56) References Cited

U.S. PATENT DOCUMENTS

| | | | |
|---|---|---|---|
| 2004/0067063 A1* | 4/2004 | Lee et al. .................. 398/155 |
| 2004/0109639 A1* | 6/2004 | Lee et al. .................. 385/27 |
| 2004/0240889 A1* | 12/2004 | Lee et al. .................. 398/155 |
| 2006/0024065 A1* | 2/2006 | Von Lerber .................. 398/155 |
| 2006/0061402 A1* | 3/2006 | Lee et al. .................. 327/291 |
| 2006/0233555 A1* | 10/2006 | Lee et al. .................. 398/155 |
| 2006/0280506 A1* | 12/2006 | Lee et al. .................. 398/155 |
| 2007/0053691 A1* | 3/2007 | Von Lerber .................. 398/85 |

FOREIGN PATENT DOCUMENTS

| | | |
|---|---|---|
| JP | 08-191268 | 7/1996 |
| KR | 2003-0032012 | 4/2003 |

* cited by examiner

Primary Examiner—Ken N Vanderpuye
Assistant Examiner—Daniel G Dobson
(74) Attorney, Agent, or Firm—Ladas & Parry LLP

(57) ABSTRACT

An apparatus and method for extracting an optical clock signal are provided. The method includes splitting a predetermined polarization component from an input optical signal, selecting frequency components for clock signal extraction from the predetermined polarization component and amplifying the selected frequency components, rotating the amplified frequency components by a predetermined angle and then reflecting them, amplifying the reflected frequency components and removing noise from the amplified frequency components using a Fabry-Perot filter, and obtaining a beat frequency component from the frequency components from which noise has been removed using the Fabry-Perot filter to extract a clock signal. Accordingly, influence of the pattern of the input optical signal is reduced and the apparatus and method are provided at low price.

18 Claims, 4 Drawing Sheets

METHOD AND APPARATUS FOR EXTRACTING OPTICAL CLOCK SIGNAL

CROSS-REFERENCE TO RELATED PATENT APPLICATIONS

This application claims the benefit of Korean Patent Application No. 10-2005-0096948, filed on Oct. 14, 2005, in the Korean Intellectual Property Office, the disclosure of which is incorporated herein in its entirety by reference.

BACKGROUND OF THE INVENTION

1. Field of the Invention

The present invention relates to a method and apparatus for extracting an optical clock signal, and more particularly, to a method and apparatus for extracting an optical clock signal using a bi-directional amplifier and a Fabry-Perot filter.

2. Description of the Related Art

With the increase of transmission speed in optical communication and the development of transmitters converting data into optical signals, the improvement is also needed in a signal processing rate of a receiver, which receives an optical signal and converts it back to the original data. To satisfy the request, methods and apparatuses for extracting an optical clock signal have been devised.

To extract an optical clock signal a method using a self-pulsating laser diode, a method using an optical loop mirror, a method using an optical tank circuit, etc. have been devised. However, it is still difficult to manufacture an optical element for extracting a desired clock signal and an optical system is still unstable.

To overcome these problems, a method of recovering a clock signal using a frequency component existing in an optical spectrum has been suggested. In other words, two adjacent frequency components corresponding to the data transmission rate of a received optical signal are extracted and a beat frequency component, corresponding to the difference between the two spectral lines, is generated, whereby a clock signal is recovered.

In the above-described conventional method, two frequency components are selected from an optical spectrum and adjusted to have the same intensity. Thereafter, a beat frequency component is obtained from the two frequency components, thereby obtaining a clock signal for an optical signal. To select two frequency components and adjust them to have the same intensity, a conventional method illustrated in FIG. 1 is used.

FIG. 1 illustrates a conventional circuit for extracting an optical clock signal using a tunable band-pass filter 120. Referring to FIG. 1, in order to make first and second frequency components or second and third frequency components have the same intensity in an input frequency spectrum 110, the intensity of the second frequency component should be decreased.

For example an input optical signal with the input frequency spectrum 110 is passed through the tunable band-pass filter 120. The tunable band-pass filter 120 adjusts amplitudes of frequency components, thereby making the first and second frequency components or the second and third frequency components have the same intensity. In detail, the tunable band-pass filter 120 puts the first or third frequency component at a point P1 giving the least attenuation and puts the second frequency component at a point P2 giving the most attenuation to make the first and second frequency components or the second and third frequency components have the same intensity. Reference numeral 130 denotes the characteristic of the tunable band-pass filter 120.

Here, a difference between the intensity of the first frequency component and the intensity of the second frequency component or between the intensity of the second frequency component and the intensity of the third frequency component must be similar to a difference between the attenuation at the point P1 and the attenuation at the point P2 in the tunable band-pass filter 120 to make the first and second frequency components or the second and third frequency components have the same intensity to an acceptable accuracy. When a difference between the intensity difference and the attenuation difference is great, the method illustrated in FIG. 1 is not efficient. In other words, the tunable band-pass filter 120 suitable to the characteristics of the optical spectrum of the input optical signal needs to be used or the tunable band-pass filter 120 needs to be specially manufactured to be suitable to the characteristics of the optical spectrum of the input optical signal. Reference numeral 140 denotes an optical spectrum of the optical signal that has passed through the tunable band-pass filter 120.

Moreover, in the method illustrated in FIG. 1, an extracted clock signal is greatly influenced by the pattern of an input optical signal. In other words, when data of the input optical signal is continuously "0" or "1", a clock signal component may disappear.

SUMMARY OF THE INVENTION

The present invention provides a method and apparatus for extracting an optical clock signal using a bi-directional amplifier and a Fabry-Perot filter, thereby greatly decreasing the influence of the pattern of an input optical signal, maximizing the efficiency of the bi-directional amplifier, and removing noise components.

According to an aspect of the present invention, there is provided an apparatus for extracting an optical clock signal. The apparatus includes a reflector rotating frequency components of an input optical signal by a predetermined angle and then reflecting them; a bi-directional amplifier amplifying frequency components of the input optical signal before transmitting them to the reflector and amplifying frequency components reflected from the reflector; a polarization beam splitter splitting a predetermined polarization component from the optical input signal through an input terminal; a Fabry-Perot filter selecting frequency components for clock signal extraction from the predetermined polarization component received from the polarization beam splitter, transmitting the selected frequency components to the bi-directional amplifier, and removing noise from the frequency components that have been reflected from the reflector and amplified by the bi-directional amplifier; and a photodetector receiving the noise-removed frequency components from the Fabry-Perot filter and obtaining a beat frequency component from the noise-removed frequency components to extract an optical clock signal.

According to another aspect of the present invention, there is provided a method of extracting an optical clock signal. The method includes splitting a predetermined polarization component from an input optical signal; selecting frequency components for clock signal extraction from the predetermined polarization component and amplifying the selected frequency components; rotating the amplified frequency components by a predetermined angle and then reflecting them; amplifying the reflected frequency components and removing noise from the amplified frequency components using a Fabry-Perot filter; and obtaining a beat frequency component from the noise-removed frequency components to extract a clock signal.

According to another aspect of the present invention, there is provided a computer readable recording medium for recording a program for executing the method in a computer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the attached drawings.

Figure 1:
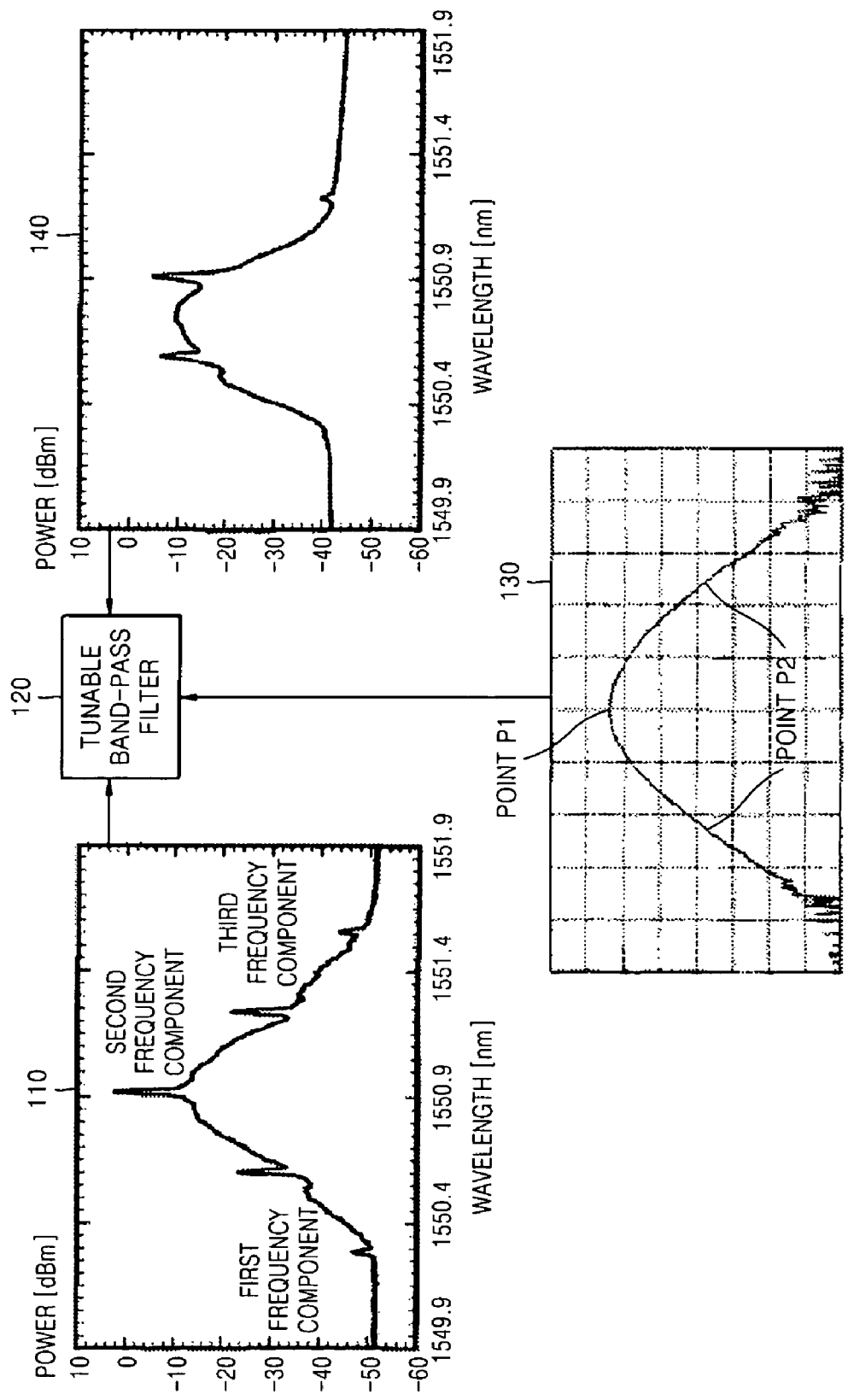
FIG. 1 illustrates a conventional circuit for extracting an optical clock signal using a tunable band-pass filter.
Figure 2:
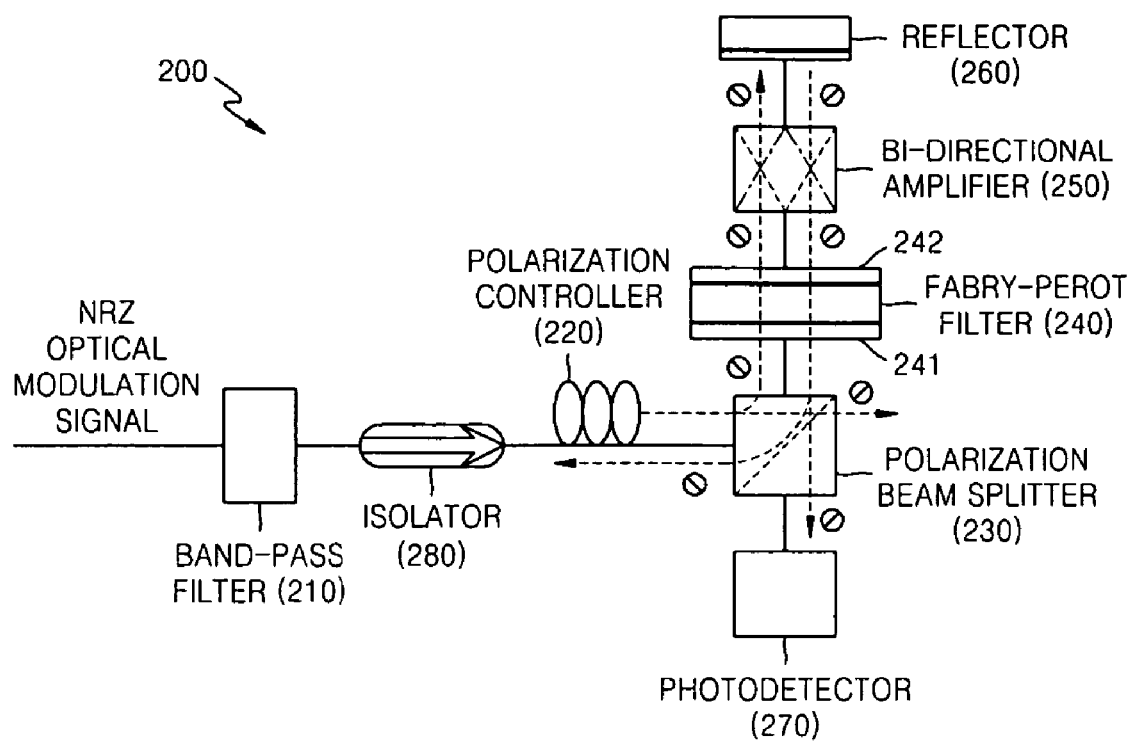
FIG. 2 is a block diagram of an apparatus for extracting an optical clock signal according to an embodiment of the present invention.

FIG. 2 is a block diagram of an apparatus 200 for extracting an optical clock signal according to an embodiment of the present invention. Referring to FIG. 2, the apparatus 200 includes a band-pass filter 210, a polarization controller 220, a polarization beam splitter 230, a Fabry-Perot filter 240, a bi-directional amplifier 250, a reflector 260, a photodetector 270, and an isolator 280. The reflector 260 may be implemented using a Faraday rotator mirror.

The band-pass filter 210 selects a predetermined frequency band with properly adjusted amplitudes in an input optical signal. The predetermined frequency band with properly adjusted amplitudes includes a central frequency component and one among a plurality of side frequency components. The input optical signal input to the band-pass filter 210 may be a non-return-to-zero (NRZ) optical modulation signal. In detail, a 40 Gb/s NRZ optical modulation signal may be used as the input optical signal. However, the present invention is not restricted to this, and a return-to-zero (RZ) optical modulation signal or other types of optical signals may also be used.

The polarization controller 220 adjusts a polarization component of the input optical signal in the predetermined frequency band selected by the band-pass filter 210 to a predetermined direction and then outputs the input optical signal to the polarization beam splitter 230. The polarization controller 220 is used to allow the photodetector 270 to extract an optical clock signal with maximum optical power.

The polarization beam splitter 230 splits a predetermined polarization component from the input optical signal received from the polarization controller 220 and outputs the predetermined polarization component to the Fabry-Perot filter 240.

Generally, an input optical signal input to the Fabry-Perot filter 240 may be in a state of "1" within a cavity for a certain period of time due to a mirror effect of the cavity formed in the Fabry-Perot filter 240. This phenomenon brings the same effect as if a value of "1" is inserted into a time slot having a value of "0" when the input optical signal is continuously "0".

The Fabry-Perot filter 240 selects frequency components for clock signal extraction from the predetermined polarization component received from the polarization beam splitter 230 and outputs the frequency components to the bi-directional amplifier 250. The frequency components include a central frequency component and one of a plurality of side-peak frequency components positioned at the sides of the central frequency component.

The bi-directional amplifier 250 amplifies the frequency components received from the Fabry-Perot filter 240 and outputs the amplified frequency components to the reflector 260.

The reflector 260 rotates the polarization components of the amplified frequency components received from the bi-directional amplifier 250 by a predetermined angle (e.g., 90 degrees) and then returns the frequency components to the bi-directional amplifier 250. As described above, the reflector 260 may be implemented using a Faraday rotator mirror.

The bi-directional amplifier 250 amplifies the frequency components reflected from the reflector 260.

The Fabry-Perot filter 240 removes noise from the frequency components received from the bi-directional amplifier 250. In addition, the Fabry-Perot filter 240 reduces the bandwidth of the frequency components received from the bi-directional amplifier 250.

Among frequency components passing through the Fabry-Perot filter 240, only frequency components whose polarization components have been rotated by the predetermined angle (e.g., 90 degrees) by the reflector 260 are transmitted by the polarization beam splitter 230 and input to the photodetector 270. Frequency components that are not made to satisfy the polarization condition (i.e., polarization by the predetermined angle) by the reflector 260 are input to the isolator 280 via the polarization beam splitter 230 and removed.

The isolator 280 very slightly attenuates an optical signal in a forward direction and very greatly attenuates it in a backward direction so that the optical signal is transmitted in one direction. The isolator 280 transmits the input optical signal received from the band-pass filter 210 to the polarization beam splitter 230 via the polarization controller 220 but removes the reflected optical signal received from the polarization beam splitter 230. Accordingly, optical signals are prevented from oscillating between the band-pass filter 210 and the polarization beam splitter 230, thus preventing noise from occurring.

In addition, any stray optical signals that do not pass through the Fabry-Perot filter 240 but instead are reflected from a first surface 241 of the Fabry-Perot filter 240 can be strongly attenuated and effectively removed by the isolator 280.

When an erroneous input optical signal travels back and forth between the reflector 260 and the bi-directional amplifier 250 many times, the input optical signal can have the same polarization state as an input optical signal which arrives directly to the reflector 260 from the polarization beam splitter 230. In other words, when an input optical signal, passing through the bi-directional amplifier 250, is reflected by the reflector 260, the polarization of the input optical signal is rotated by 90 degrees. Part of the polarization-changed input optical signal is reflected from a second surface 242 of the Fabry-Perot filter 240, which faces the reflector 260, and travels back to the reflector 260. Then, this part of the input optical signal is re-reflected by the reflector 260 and its polarization is rotated by 90 degrees again. As a result, the part of the input optical signal has the same polarization state as the initial input optical signal. Accordingly, when an input optical signal is reflected by the reflector 260 an odd number of times, the input optical signal has a polarization state allowing the input optical signal to travel to the photodetector 270. However, when the input optical signal is reflected by the reflector 260 an even number of times, the input optical signal has the same polarization state as it has when it is initially input, and therefore, the input optical signal cannot pass to the photodetector 270 but instead proceeds to the isolator 280.

The isolator 280 is disposed between the band-pass filter 210 and the polarization beam splitter 230. In detail, the isolator 280 may be disposed between the band-pass filter 210 and the polarization controller 220 or between the polarization controller 220 and the polarization beam splitter 230.

The photodetector 270 receives frequency components from which noise is removed by the Fabry-Perot filter 240 and combines them to generate a beat frequency in order to extract a clock signal.

Figure 3:
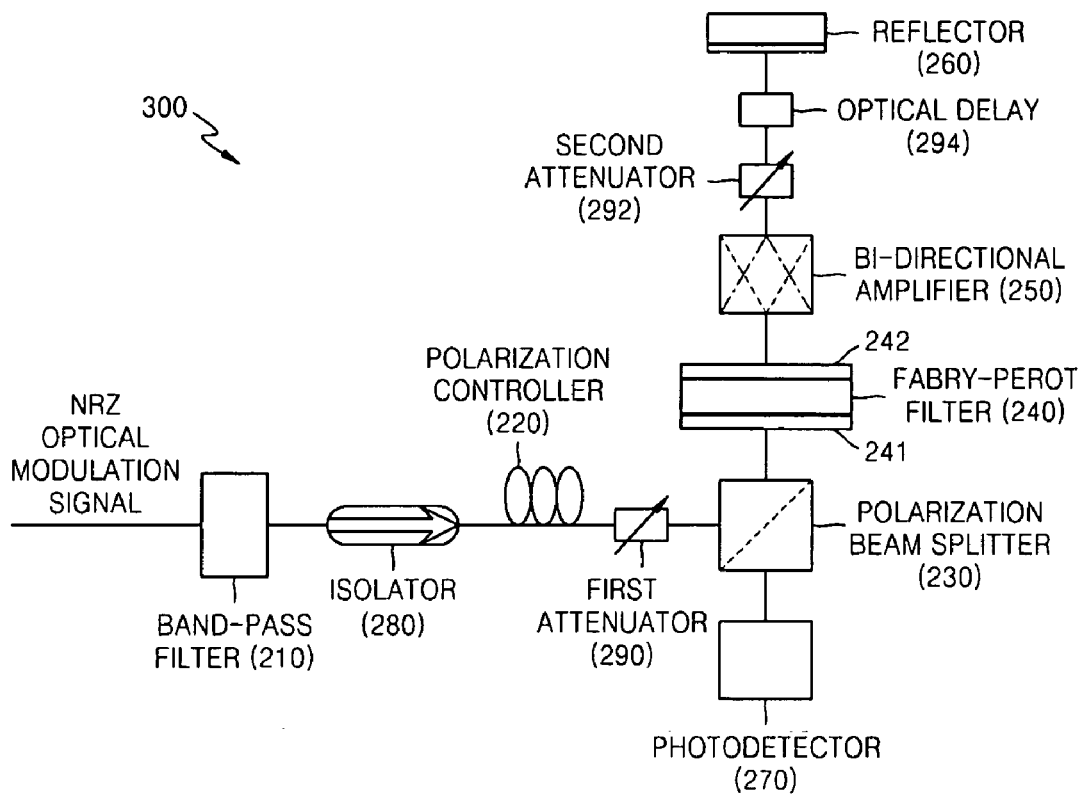
FIG. 3 is a block diagram of an apparatus for extracting an optical clock signal according to another embodiment of the present invention.

FIG. 3 is a block diagram of an apparatus 300 for extracting an optical clock signal according to another embodiment of the present invention. The apparatus 300 includes a band-pass filter 210, a polarization controller 220, a polarization beam splitter 230, a Fabry-Perot filter 240, a bi-directional amplifier 250, a reflector 260, a photodetector 270, an isolator 280, a first attenuator 290, a second attenuator 292, and an optical delay line 294.

The description of the apparatus 200 illustrated in FIG. 2 will be referred to for the elements having the same reference numerals as those illustrated in FIG. 2. The first attenuator 290, the second attenuator 292, and the optical delay 294 will be described below.

The first attenuator 290 is disposed between the band-pass filter 210 and the polarization beam splitter 230 to attenuate an input optical signal by a predetermined amount.

The second attenuator 292 is disposed between the bi-directional amplifier 250 and the reflector 260 to attenuate a frequency component of the input optical signal received from the bi-directional amplifier 250 by a predetermined amount.

The first attenuator 290 and the second attenuator 292 prevent high noise levels being created when the input optical signal with high power is input to the bi-directional amplifier 250. In other words, the first attenuator 290 and the second attenuator 292 adjust optical power input to the bi-directional amplifier 250 so that the bi-directional amplifier 250 amplifies the input optical signal with minimum noise.

The optical delay 294 delays the frequency component of the input optical signal passing through the second attenuator 292 by a predetermined period of time and then outputs it to the reflector 260.

Figure 4:
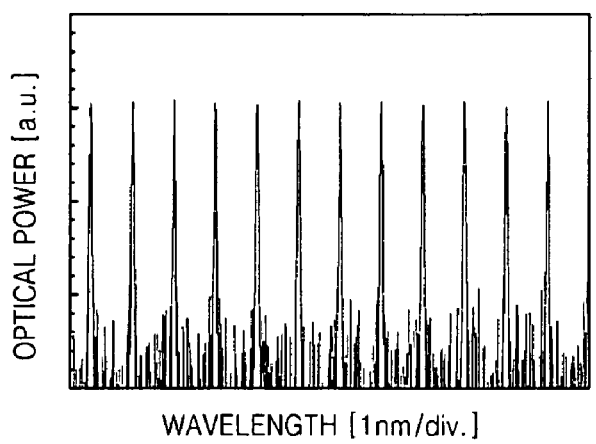
FIG. 4 is a graph of a spectrum illustrating frequency characteristics of a Fabry-Perot filter used in the apparatuses illustrated in FIGS. 2 and 3.

FIG. 4 is a graph of a spectrum illustrating frequency characteristics of the Fabry-Perot filter 240 illustrated in FIGS. 2 and 3. Referring to FIG. 4, a free spectral range (FSR) of the Fabry-Perot filter 240, used to select frequency components for clock signal extraction, is set to be the same as a period of an input NRZ optical modulation signal. The frequency characteristics of the Fabry-Perot filter 240 are illustrated in FIG. 4. Here, a distance between a central frequency component and an adjacent side-peak frequency component is referred to as an FSR. A spectrum of the input NRZ optical modulation signal has a central frequency component and side-peak frequency components at both sides, respectively, of the central frequency component at a distance corresponding to a period of the input NRZ optical modulation signal.

Since the FSR of the Fabry-Perot filter 240 used in the embodiments of the present invention is the same as the period of an input optical signal, a clock signal can be restored by obtaining a beat frequency component from a central frequency component and one of two side-peak frequency components of frequency components of the input optical signal. When the clock signal is extracted using this method, influence of the pattern of the input optical signal can be reduced.

Figure 5:
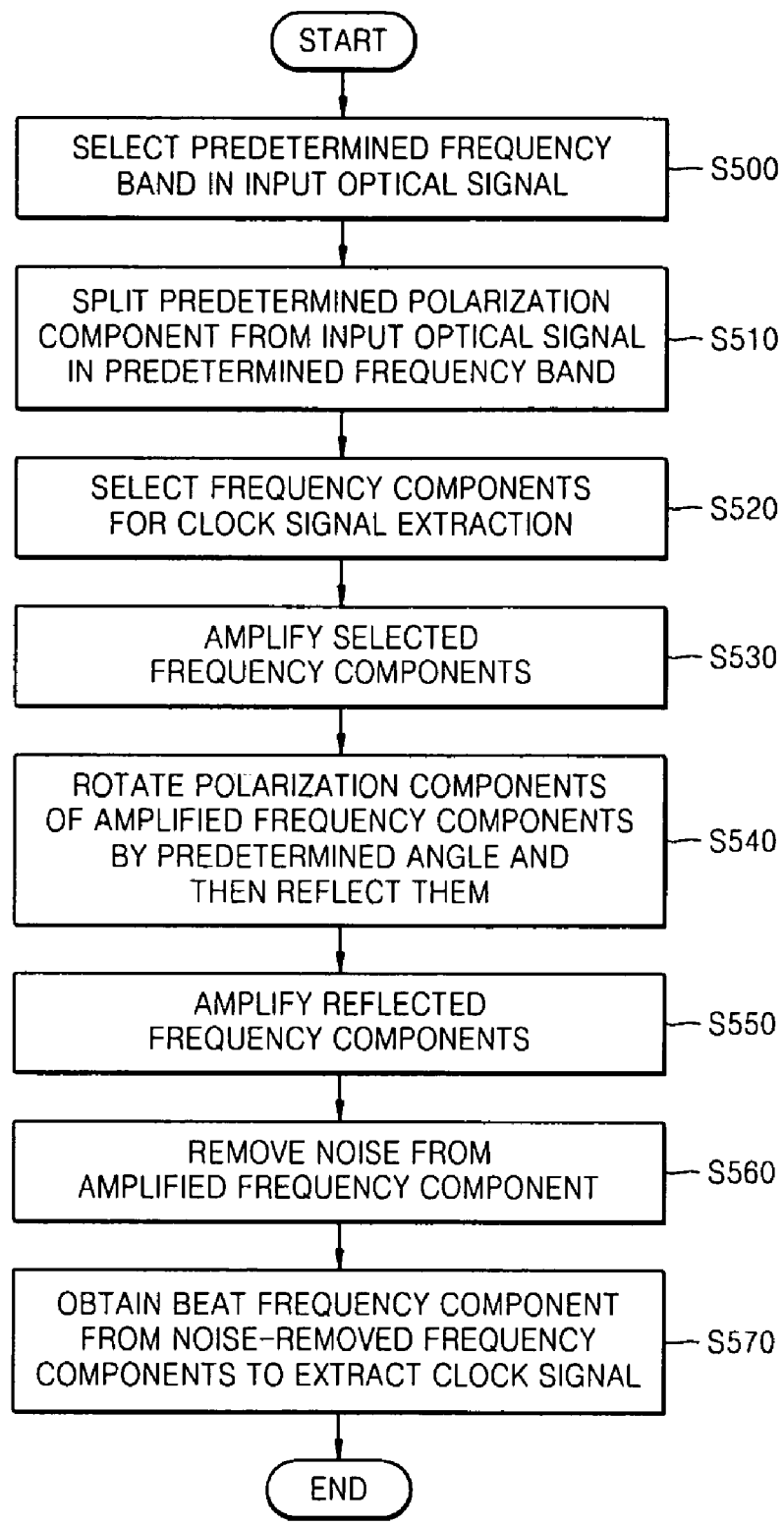
FIG. 5 is a flowchart of a method of extracting an optical clock signal according to an embodiment of the present invention.

FIG. 5 is a flowchart of a method of extracting an optical clock signal according to an embodiment of the present invention. In operation S500, a predetermined frequency band is selected from an input optical signal. This selection may be performed using the band-pass filter 210 (FIG. 2). The predetermined frequency band includes a central frequency component and one among a plurality of side frequency components. As described above with reference to FIG. 2, the input optical signal may be an NRZ optical modulation signal. However, the present invention is not restricted to this; therefore the input optical signal may be an RZ optical modulation signal.

In operation S510, a predetermined polarization component is split from the input optical signal in the selected frequency band. An operation of adjusting the polarization component to a predetermined orientation may be further performed between operations S500 and S510 so that the input optical signal having the adjusted polarization component is subjected to operation S510.

In operation S520, frequency components for clock signal extraction are selected from the predetermined polarization component using the Fabry-Perot filter 240 (FIG. 2). Here, the selected frequency components include a central frequency component and one among a plurality of side frequency components.

In operation S530, the selected frequency components are amplified. The amplification may be performed using the bi-directional amplifier 250 (FIG. 2).

In operation S540, the amplified frequency components are rotated by a predetermined angle (e.g., 90 degrees) and then reflected. Here, the Faraday rotator mirror 260 (FIG. 2) may be used to receive the amplified frequency components and rotate them by the predetermined angle before reflecting them.

In operation S550, the reflected frequency components are amplified. Here, the bi-directional amplifier 250 may be used to amplify the reflected frequency components.

In operation S560, noise is removed from the amplified frequency components. Here, the Fabry-Perot filter 240 may be used to remove noise from the amplified frequency components.

In operation S570, a beat frequency component is obtained from the frequency components from which noise has been removed, thereby extracting a clock signal.

An operation of removing frequency components that have not been polarized by the predetermined angle in operation S540 from the frequency components, from which noise has been removed using the Fabry-Perot filter 240 in operation S560, may be further performed using the isolator 280 (FIG. 2) between operations S560 and S570.

In addition, an operation of removing frequency components that do not pass through the Fabry-Perot filter 240 but are reflected from the first surface of the Fabry-Perot filter 240 using the isolator 280 may be further performed, wherein the isolator 280 very slightly attenuates an optical signal in a forward direction and very greatly attenuates it in a backward direction so that the optical signal is transmitted in one direction.

The Fabry-Perot filter 240, used to select frequency components for clock signal extraction in the method illustrated in FIG. 5, is manufactured to have an FSR equal to a period of an input NRZ optical modulation signal. The general frequency characteristics of the Fabry-Perot filter 240 have been described above with reference to FIG. 4.

The descriptions of FIGS. 2 through 4 will be referred to for more details.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

In conventional methods and apparatuses for extracting an optical clock signal, influence of the pattern of an input optical signal is very large. However, in the present invention, the influence is remarkably reduced due to the characteristics of a Fabry-Perot filter.

In addition, amplification efficiency is maximized by using a bi-directional amplifier. The present invention uses the bi-directional amplifier together with the Fabry-Perot filter, thereby selecting frequency components (i.e., a central frequency component and one among side-peak frequency components) for clock signal extraction and removing noise occurring in the bi-directional amplifier. Moreover, since the bi-directional amplifier and the Fabry-Perot filter are not expensive, the present invention provides an inexpensive apparatus and method for extracting an optical clock signal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for extracting an optical clock signal, the apparatus comprising:
    a reflector rotating frequency components of an input optical signal by a predetermined angle and then reflecting them;
    a bi-directional amplifier amplifying frequency components of the input optical signal before transmitting them to the reflector and amplifying frequency components reflected from the reflector;
    a polarization beam splitter splitting a predetermined polarization component from the optical input signal through an input terminal;
    a Fabry-Perot filter selecting frequency components for clock signal extraction from the predetermined polarization component received from the polarization beam splitter, transmitting the selected frequency components to the bi-directional amplifier, and removing noise from the frequency components that have been reflected from the reflector and amplified by the bi-directional amplifier; and
    a photodetector receiving the noise-removed frequency components from the Fabry-Perot filter and obtaining a beat frequency component from the noise-removed frequency components to extract an optical clock signal.

2. The apparatus of claim 1, further comprising a band-pass filter selecting a predetermined frequency band from the input optical signal input through the input terminal and outputting the predetermined frequency band of the input optical signal to the polarization beam splitter.

3. The apparatus of claim 2, further comprising an isolator disposed between the band-pass filter and the polarization beam splitter to remove frequency components that are reflected from the polarization beam splitter and input to the band-pass filter.

4. The apparatus of claim 2, further comprising a polarization controller adjusting polarization components of the input optical signal in the predetermined frequency band selected by the band-pass filter to a specified polarization and then outputting the input optical signal to the polarization beam splitter.

5. The apparatus of claim 4, further comprising an attenuator disposed between the polarization controller and the polarization beam splitter to attenuate the input optical signal by a predetermined amount.

6. The apparatus of claim 2, further comprising a first attenuator disposed between the band-pass filter and the polarization beam splitter to attenuate the input optical signal by a predetermined amount.

7. The apparatus of claim 6, further comprising:
    a second attenuator disposed between the bi-directional amplifier and the reflector to attenuate the frequency components of the input optical signal received from the bi-directional amplifier by a predetermined amount; and
    an optical delay delaying the frequency components of the input optical signal received from the second attenuator by a predetermined period of time and then outputting them to the reflector.

8. The apparatus of claim 1, wherein the Fabry-Perot filter has a free spectral range equal to a period of the input optical signal.

9. The apparatus of claim 1, wherein the mirror is a Faraday rotator mirror.

10. The apparatus of claim 1, wherein the predetermined angle of rotation of the frequency components in the reflector is 90 degrees.

11. A method of extracting an optical clock signal, the method comprising:
    splitting a predetermined polarization component from an input optical signal;
    selecting frequency components for clock signal extraction from the predetermined polarization component and amplifying the selected frequency components;
    rotating the amplified frequency components by a predetermined angle and then reflecting them;
    amplifying the reflected frequency components and removing noise from the amplified frequency components using a Fabry-Perot filter; and
    obtaining a beat frequency component from the frequency components from which noise has been removed using the Fabry-Perot filter to extract a clock signal.

12. The method of claim 11, further comprising selecting a predetermined frequency band in the input optical signal before splitting the predetermined polarization component.

13. The method of claim 12, further comprising adjusting polarization components of the input optical signal in the predetermined frequency band.

14. The method of claim 11, further comprising, after the amplifying of the reflected frequency components and the removing of the noise, removing, using an isolator, frequency components that are not rotated by the predetermined angle from among the frequency components from which the noise is removed using the Fabry-Perot filter.

15. The method of claim 11, wherein the Fabry-Perot filter has a free spectral range equal to a period of the input optical signal.

16. The method of claim 11, wherein the rotating of the amplified frequency components by a predetermined angle and the reflecting are performed using a Faraday rotator mirror.

17. The method of claim 11, wherein the input optical signal is one of a no-return-to-zero (NRZ) optical modulation signal and a return-to-zero (RZ) optical modulation signal.

18. The method of claim 11, wherein the predetermined angle by which the amplified frequency components are rotated is 90 degrees.

* * * * *